US005771807A

United States Patent [19]

Moss

[11] Patent Number: 5,771,807

[45] Date of Patent: Jun. 30, 1998

[54] REUSABLE MANDREL FOR USE IN A PRINTING PRESS

[75] Inventor: James R. Moss, Satellite Beach, Fla.

[73] Assignee: Presstek, Inc., Hudson, N.H.

[21] Appl. No.: 748,597

[22] Filed: Nov. 13, 1996

[51] Int. Cl.[6] .............................. B41F 13/10; B41F 1/28; B23B 5/22

[52] U.S. Cl. ...................... 101/375; 101/378; 101/415.1; 279/2.11; 242/573.1

[58] Field of Search .................................. 101/375, 378, 101/453, 415.1; 242/573, 573.1; 279/2.11, 2.12, 2.14

[56] References Cited

U.S. PATENT DOCUMENTS 4,386,566 6/1983 Moss ..................................... 101/375
4,648,736 3/1987 Harsch et al. ......................... 403/297
4,794,858 1/1989 Katz ....................................... 101/375
5,516,086 5/1996 Tankersley ............................... 269/69

*Primary Examiner*—Edgar S. Burr
*Assistant Examiner*—Dave A. Ghatt
*Attorney, Agent, or Firm*—Cesari and McKenna, LLP

[57] ABSTRACT

A reusable mandrel for use in a plate cylinder of a printing press. The reusable mandrel includes two semi-cylindrical shells spaced slightly apart to form a tube having two opposing longitudinal slots. Disposed inside the tube is a controller that may be activated in order to selectively adjust the diameter of the tube. The tube is preferably set at an initial diameter so that the tube may incrementally accept plate material from a supply mandrel. Thereafter, the controller may be activated in order to decrease the diameter of the tube so that the tube may be removed from a spool of used plate material.

22 Claims, 7 Drawing Sheets

REUSABLE MANDREL FOR USE IN A PRINTING PRESS

FIELD OF THE INVENTION

The present invention relates generally to offset printing machines and, more specifically, to a reusable mandrel for use with a plate cylinder.

BACKGROUND OF THE INVENTION

In offset lithography, an image is present on a printing plate as a pattern or "image" of ink-accepting (oleophilic) and ink-repellent (oleophobic) surface areas. In a typical sheet-fed offset press system, the imaged plate is mounted to a plate cylinder, where it is inked. The plate is then brought into contact with the compliant surface of a blanket cylinder and the image is transferred (i.e., offset) to the blanket cylinder. The blanket cylinder, in turn, applies the image to the printing medium (e.g., paper sheets) which are brought into contact with the blanket cylinder by an impression cylinder.

Although the printing plates for an offset press were traditionally imaged photographically, more recently, a number of electronic alternatives have been developed for placing the image onto the plate. These digitally controlled imaging devices include lasers that chemically alter or destroy one or more plate layers, ink jets that directly deposit ink-repellent or ink-accepting spots on a plate blank and spark or ion discharge devices which physically alter the topology of the plate blank. These various methods of imaging lithographic plates are described in detail in U.S. Pat. Nos. 3,506,779; 4,054,094; 4,347,785; 4,911,075 and 5,385,092, among others.

These methods, moreover, may be used with the printing plate already mounted to the plate cylinder. That is, the plates may be imaged "on-press" to improve the operating efficiency of the printing press. Such printing machines may include a plate cylinder utilizing an automatic plate-loading system, such as that described in U.S. Pat. No. 5,355,795 to Moss, et al. (co-owned with the present application). In these systems, a spool of plate material is typically provided on a supply mandrel that is rotatably mounted inside the plate cylinder. The plate material is drawn from the supply mandrel, passed through a slot in the cylinder and wrapped around the outside surface of the cylinder. The plate material is then passed back through the slot (or through a second slot) and threaded onto a take-up mandrel that is also rotatably mounted inside the cylinder.

Any movement of the plate material during the printing process will ruin the subsequent images. Accordingly, the plate material is tightened about the surface of the cylinder by locking the supply mandrel and rotating the take-up mandrel. The tension at the take-up mandrel is on the order of 3.25 Newtons per millimeter of plate material width. This high tension is necessary in order to overcome the friction at the cylinder surface and to ensure that the plate material remains stationary under the reactive forces of the blanket cylinder. This high plate tension, however, imposes substantial compressive, bending and twisting loads on the take-up mandrel. Consequently, take-up mandrels are typically formed from modified steel tubes.

Once a printing run is finished, the take-up mandrel is typically rotated (with the supply mandrel unlocked) in order to advance a fresh sheet of plate material onto the surface of the plate cylinder. The plate material may then be tightened and imaged as discussed above to prepare the cylinder for printing. This process may be repeated until the supply mandrel has exhausted its supply of fresh plate material at which point the supply and take-up mandrels may be removed from the plate cylinder. The supply and take-up mandrels may be arranged within a cassette to simplify the installation and removal of the mandrels from the plate cylinder.

The take-up mandrel is now encased within a spool of tightly wrapped used plate material. Rather than attempt to unwind the used plate material from the mandrel, which would require additional equipment and significant time, the take-up mandrel is typically discarded along with the used plate material. A new take-up mandrel is then installed in the plate cylinder. Similarly, the empty supply mandrel is also discarded and a new supply mandrel, having a fresh supply of plate material, is installed in the plate cylinder.

Due to the limited amount of space inside the plate cylinder, a supply mandrel can typically hold only enough plate material to produce about thirty different images. That is, after thirty images all of the plate material will have been transferred from the supply mandrel to the take-up mandrel. Moreover, a separate printing cylinder and, consequently, a separate set of take-up and supply mandrels, is required for each color station along the printing press. Since most color presses run with four colors (e.g., cyan, magenta, yellow and black, the "CMYK" model), four mandrels are discarded every thirty image runs. The replacement of multiple take-up and supply mandrels results in significant costs to the press operator.

SUMMARY OF THE INVENTION

It is an object of the present invention to provide a mandrel that may be re-used in a printing press.

It is a further object of the present invention to provide a mandrel having a selectively adjustable diameter so that the mandrel may be removed from a spool of used plate material by decreasing its diameter.

It is a still further object of the present invention to provide a mandrel that may be quickly and easily removed from a spool of plate material by the press operator.

Briefly, the invention comprises two semi-cylindrical shells spaced slightly apart to form a tube having two opposing longitudinal slots. Inside the tube is a controller that operably engages the two shells. The controller may be expanded thereby forcing the two shells further apart or retracted thereby drawing the two shells closer together. By expanding or retracting the controller, a press operator is able to selectively adjust the diameter of the tube. In the expanded position, the tube may be used as a take-up mandrel for incrementally accepting used plate material from a supply mandrel. After an entire supply of plate material has been transferred to the take-up mandrel, the controller may be retracted thereby reducing the diameter of the tube to allow its removal from the spool of tightly wrapped used plate material. That is, the mandrel (i.e., the two semi-cylindrical shells and the controller) may be drawn out from the spool of plate material. Thereafter, the controller may be expanded so that the tube is returned to its original diameter. The tube is then ready for re-use as a take-up mandrel.

In the illustrated embodiment, the controller comprises a pair of subassemblies that are disposed inside the tube. Each subassembly preferably includes a pair of opposing wedges sandwiched between two spreader bars. The two opposing wedges are operably connected by a differential screw so that the wedges may be pulled closer together or driven further apart. Each spreader bar, moreover, includes an inner face that preferably slides relative to the sloped surfaces of the adjacent wedges when the wedges are moved via the differential screw. In addition, each spreader bar has a generally v-shaped outer surface defining an apex and two contact surfaces for engaging the shells.

Each subassembly is preferably arranged within the tube such that the apices of the spreader bars are aligned along opposing longitudinal slots in the tube and the two subassemblies are spaced slightly apart. The wedges, moreover, may be aligned to move along the axis of the tube. Since the spreader bars slide relative to the sloped surfaces of the adjacent wedges, by adjusting the differential screw and moving the two wedges axially within the tube, the spreader bars may be forced either further away from each other (i.e., radially outward) or closer together (i.e., radially inward), depending on the direction in which the screws are turned. By driving the two spreader bars further away from each other, the apices of spreader bars are driven further into the slots in the tube. This, in turn, pushes the two semi-cylindrical shells further apart since the edges of the shells remain engaged with the controlling surfaces of the spreader bars. Accordingly, the diameter of the tube may be selectively increased.

Alternatively, by drawing the two spreader bars closer together, through actuation of the differential screw in the opposite direction, the apices of the spreader bars may be retracted from the slots in the tube. With the apices retracted, the two semi-cylindrical shells collapse closer together, decreasing the diameter of the tube. With the two shells collapsed, the tube easily slides out of the spool of used plate material. Alternatively, the tube may be disassembled such that controller or one of the subassemblies thereof is removed from one end of the spool and the two semi-cylindrical shells (and the other subassembly, if necessary) are removed from the other end. Thereafter, by reassembling the tube (if necessary) and adjusting the controller so that the two cylindrical shells are once again spaced slightly apart, the tube is easily returned to its original diameter and is thus ready for re-installation and re-use inside the plate cylinder.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENT

Figure 1:
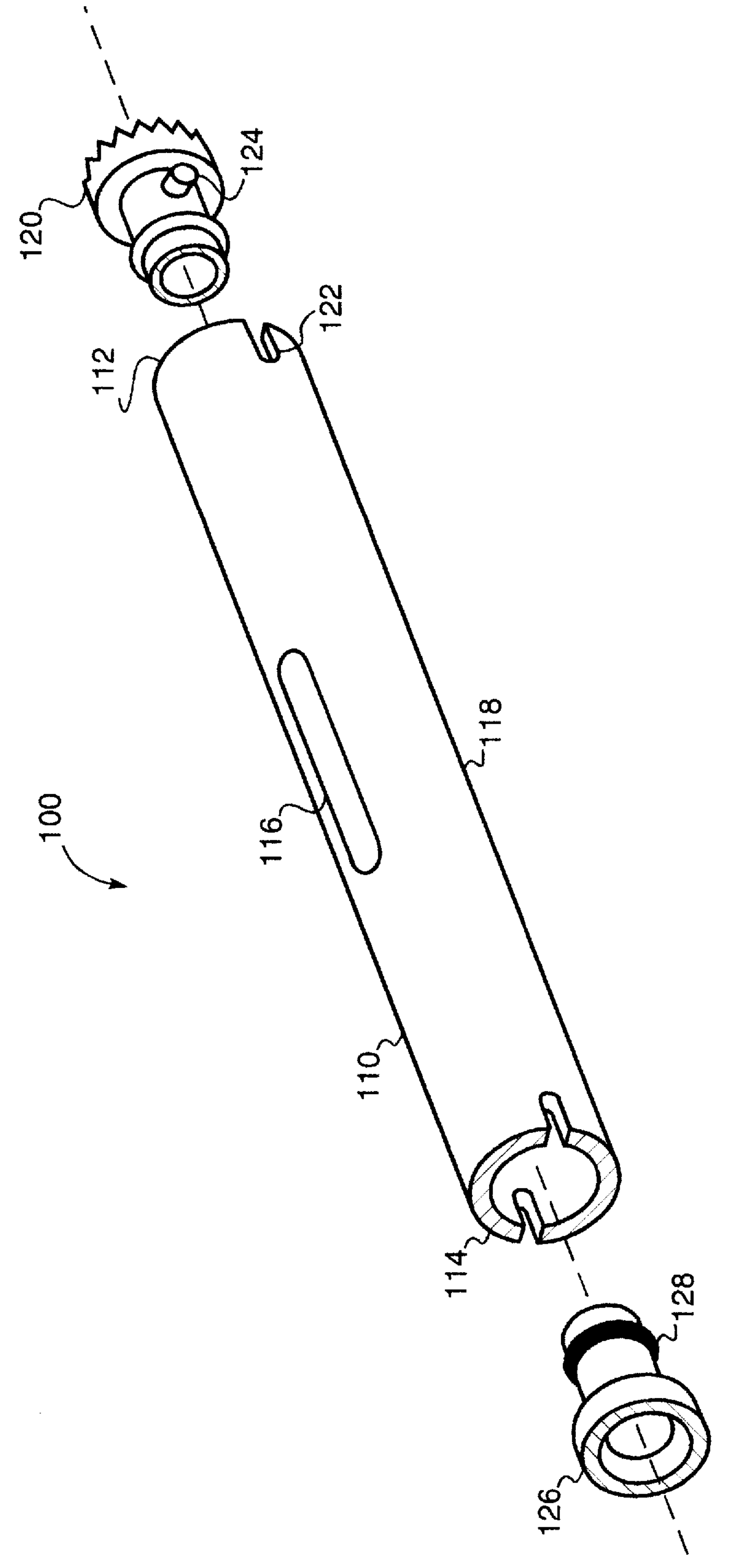
FIG. 1(PRIOR ART)
FIG. 1 is an exploded, perspective view of a prior art mandrel.

FIG. 1 is an exploded, perspective view of a prior art mandrel 100. The mandrel 100 includes an elongated, hollow tube 110 having two ends 112, 114 and a longitudinally extending slot 116. The slot 116 is typically formed in a central area 118 of the tube 110. The central area 118 is often relieved a slight amount so that the plate material (not shown) may be uniformly wound around the tube 110.

A drive gear 120 which mates with a corresponding drive means (not shown) is removably mounted at one end 112 of the tube 110. In addition, a notch 122 is typically formed at the drive end 112 of the tube 110 for receiving a drive pin 124 mounted to the drive gear. When the drive gear 120 is installed on the tube 110, the drive pin 124 transmits the torque from the drive means via the drive gear 120 to the tube 110, thus rotating the mandrel 100.

A locating cone 126 may be removably mounted to the second end 114 of the tube 110, opposite the drive end 112. The locating cone 126 mates with a support element (not shown) inside a plate cylinder (not shown) to ensure that the mandrel 100 is placed in the correct axial position within the plate cylinder. The locating cone 126, moreover, may include an 0-ring 128 to retain the locating cone 126 on the tube 110. The mandrel 100 may be used either as a take-up or supply mandrel.

Figure 2:
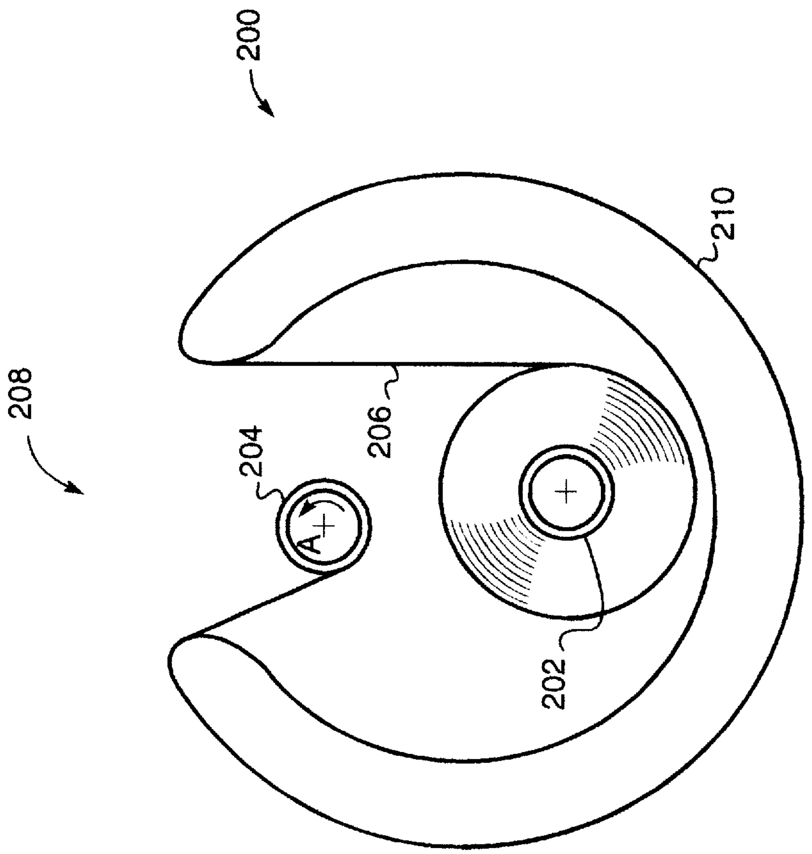
FIG. 2(PRIOR ART)
FIG. 2 is an end view of a prior art plate cylinder.

FIG. 2 is an end view of a prior art plate cylinder 200. Disposed inside the plate cylinder 200 are a supply mandrel 202 and a take-up mandrel 204 which may be of the form described above. The take-up mandrel 204 and the supply mandrel 202 each have a diameter of approximately 25.0 millimeters. Plate material 206 may be wrapped from the supply mandrel 202, through a slot 208 in the plate cylinder 200, around an outer surface 210 of the cylinder 200 and back through the slot 208 to the take-up mandrel 204. The plate material 206, moreover, typically includes a tongue (not shown) formed on a leading edge (not shown) which may be received in the slot 116 (FIG. 1) in the take-up mandrel 204, thereby attaching the plate material 206 to the take-up mandrel 204. The mandrel 204 may also include a roughened surface (not shown) to frictionally engage the initial wind of plate material 206.

Following each printing run, the take-up mandrel 204 is rotated as shown by arrow A (with the supply mandrel 202 unlocked) in order to advance fresh plate material 206 about the outer surface 210 of the cylinder 200. The supply mandrel 202 is then locked and the take-up mandrel 204 is further rotated in order to tighten the plate material 206 about the cylinder 200. The plate material 206 is typically wound at the take-up mandrel 204 to a tension of 3.25 Newtons per millimeter of plate material width.

This process, moreover, is repeated until all of the available plate material 206 has been transferred from the supply mandrel 202 to the take-up mandrel 204. The end of the plate material 206 is then disengaged from the supply mandrel 202 and the two mandrels 202, 204 are removed from the printing cylinder 200.

At this point, the take-up mandrel is encased in a spool of used plate material. Due to the high surface friction that exists between the various layers of the plate material 206 and the roughened surface, the plate material 206 remains tightly wrapped about the take-up mandrel 204, even with the take-up mandrel 204 removed from the cylinder 200. The diameter of the spool of used plate material 206, moreover, is approximately 72.0 millimeters. Consequently, the pressure exerted by the tightly wrapped plate material 206 on the take-up mandrel 204 is on the order of 20 MPa. At this pressure, the plate material is calculated to shrink to an inside diameter of approximately 24.77 millimeters. That is, if the take-up mandrel 204 were somehow removed from the spool of used plate material 206, the inner diameter of the spool would compress to approximately 24.77 millimeters.

To remove the used plate material from the prior art mandrel, the mandrel would have to be placed in some type of transfer unit which could unwind the used plate material from the take-up mandrel and wrap it about some other spindle. Most press operators have neither the equipment nor the available personnel to perform such a task. Accordingly, press operators typically discard the take-up mandrel 204 along with the used plate material 206 and install a new (i.e., empty) take-up mandrel in the plate cylinder 200. The present invention is directed to providing a re-usable mandrel having a selectively adjustable diameter such that, at the end of the printing process, the mandrel may be collapsed (e.g., to a diameter of 24.77 millimeters or less) so that the mandrel may be quickly and easily removed from the spool of used plate material. The mandrel may then be returned to its original diameter (e.g., 25.00 millimeters) and re-installed in the plate cylinder whereupon it is ready for re-use.

Figure 3A:
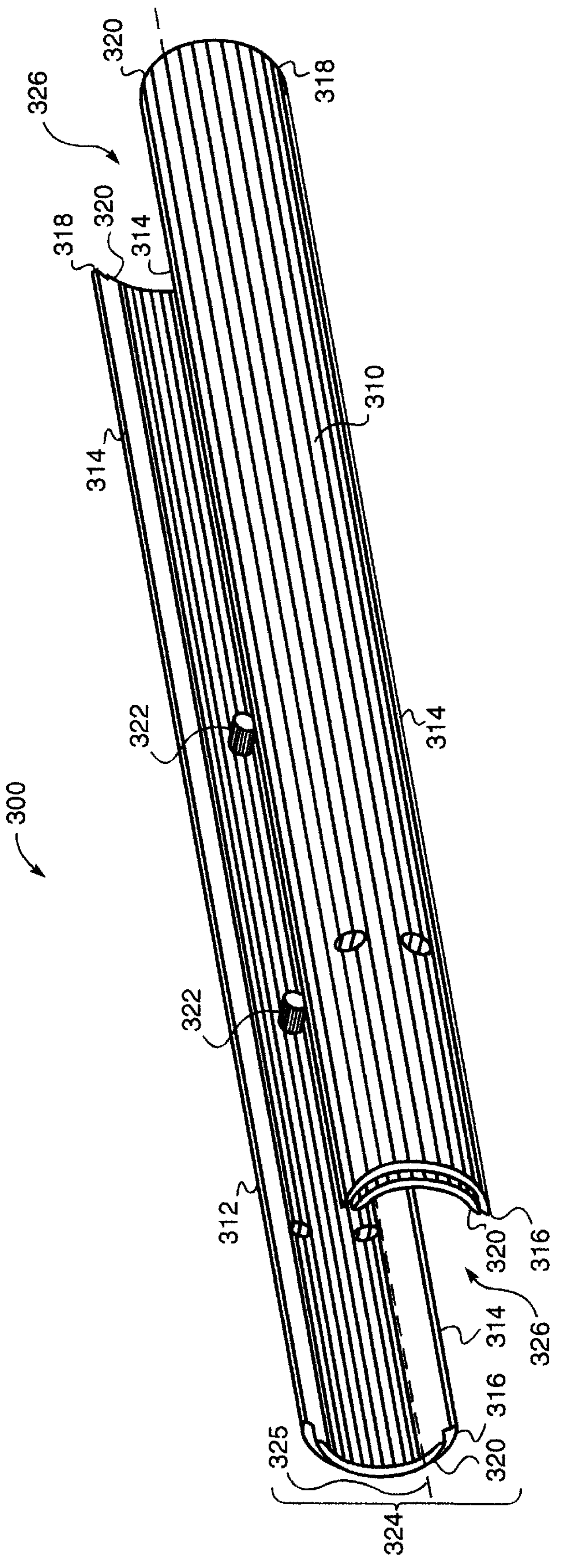
FIG. 3A is a perspective view of the tube of the re-usable mandrel in accordance with the present invention.

Referring to FIG. 3A, a re-usable mandrel 300 according to the present invention preferably comprises two semi-cylindrical shells 310, 312. Each shell 310, 312 has two longitudinal base edges 314 and two ends 316, 318. A curved boss 320 preferably extends outwardly from each end 316, 318 of each shell 310, 312. Mounted inside at least one shell 312 is a pair of stop pins 322. By spacing the two semi-cylindrical shells 310, 312 slightly apart, the two shells form a hollow tube 324 having two opposing longitudinal slots 326 (whose width is exaggerated in the figure) and a central axis 325.

Figure 3B:
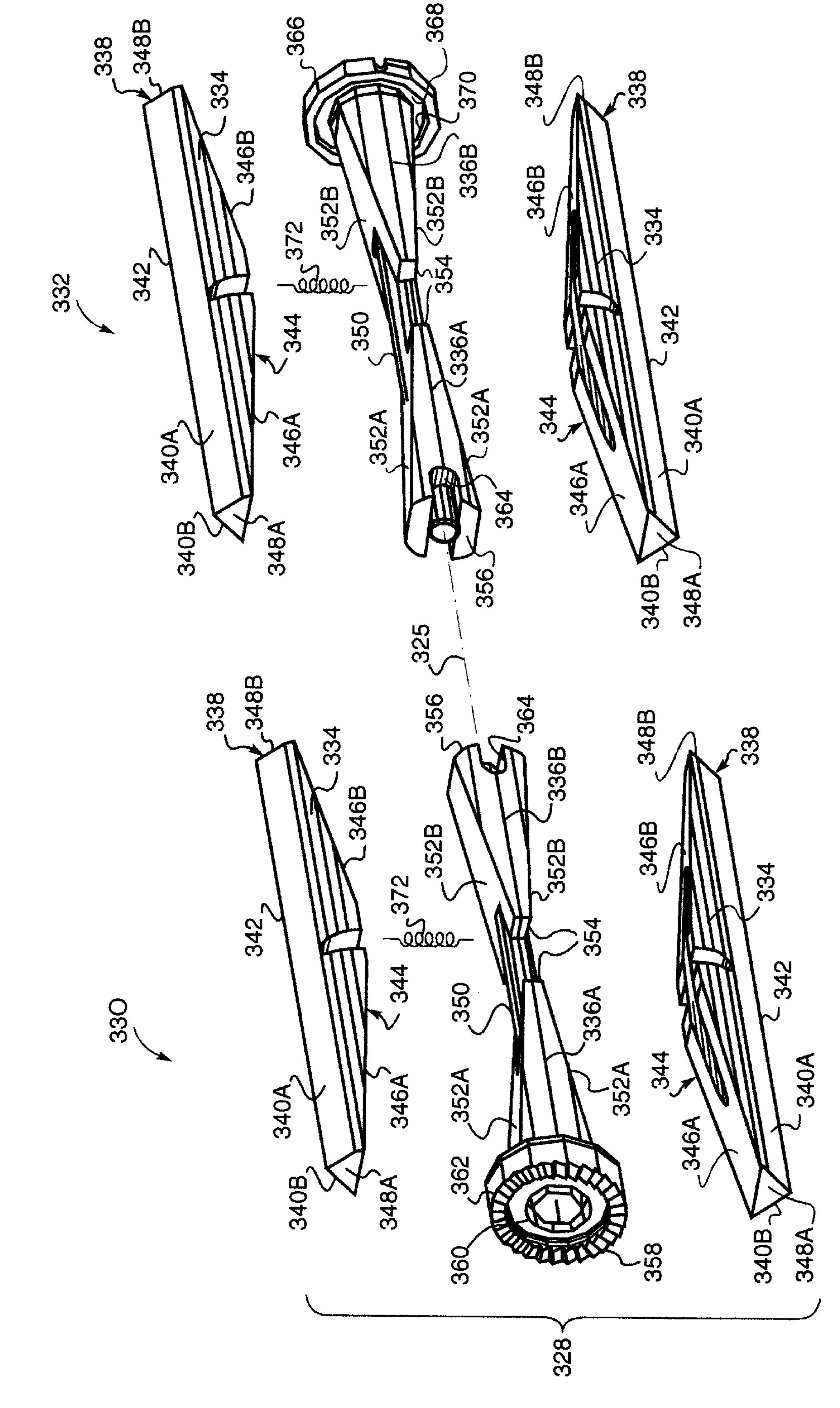
FIG. 3B is an exploded, perspective view of a controller.

As shown in FIG. 3B, the reusable mandrel 300 further includes a controller 328 that may be disposed inside the tube 324. The controller 328 operably engages the two shells 310, 312 to either draw the two shells 310, 312 closer together, thereby decreasing the diameter of the tube 324, or forcing the two shells 310, 312 further apart, thereby increasing the diameter of the tube 324. For ease of description and presentation, the controller 328 is shown in FIG. 3B in exploded view outside of the tube 324 (FIG. 3A).

The controller 328 may comprise two subassemblies 330, 332 each subassembly 330, 332 including two spreader bars 334 and two opposing wedges 336A, 336B. Each spreader bar 334, moreover, preferably includes an outer surface 338 having a generally v-shaped cross-section. Thus, the outer surface 338 of each spreader bar 334 defines two contacting surfaces 340A, 340B and an apex 342. As described below, the contacting surfaces 340A, 340B engage the shells 310, 312 at their edges 314. Each spreader bar 334 further includes an inner surface 344 with two opposing slopes 346A, 346B, such that the spreader bars 334 are tapered toward their ends 348A, 348B.

The two opposing wedges 336A, 336B included in each subassembly 330, 332 may be operably connected by a differential screw 350. By rotating the differential screw 350, the two corresponding wedges 336A, 336B may be drawn closer together or spaced further apart depending on which direction the screw 350 is turned, i.e., clockwise or counterclockwise. Each wedge 336A, 336B, moreover, has two opposing, inclined surfaces 352A, 352B, thereby defining a narrow end 354 and a wide end 356 of each wedge 336A, 336B. Each pair of wedges 336A, 336B associated with a subassembly 330, 332 are preferably arranged so that their narrow ends 354 are facing each other. Each wedge 336A, 336B further includes a centrally disposed threaded bore (not shown) for receiving a portion of the differential screw 350.

A toothed drive clutch 358 is preferably associated with one of the subassemblies 330, 332 (e.g., subassembly 330). Specifically, the toothed drive clutch 358 may be mounted to the wide end 356 of one wedge 336A associated with the subassembly 330. The toothed drive clutch 358 transmits the torque from a drive motor (not shown) to the re-usable mandrel 300 in order to rotate the mandrel 300. It should be understood that the toothed drive clutch 358 may be either securely attached to its associated wedge 336A (e.g., welded) or operably engaged via a drive pin and notch arrangement (not shown) as previously described. The toothed drive clutch 358 preferably includes a central aperture 360 to provide access to a head (not shown) of the differential screw 350. An inner face 362 of the drive clutch 358 (i.e., opposite the toothed face) preferably includes an annular-shaped recess (not shown) defining an outer wall (not shown). Formed in the wide end 356 of the wedge 336B opposite the drive clutch 358 is a notch 364 for receiving one of the stop pins 322 as described below.

The other subassembly 332, rather than having a drive clutch 358, preferably includes a locating cone 366 mounted to the wide end 356 of one wedge 336B. The locating cone 366 similarly has a central aperture (not shown) for access to the head of the corresponding differential screw 350 located therein. The locating cone 366 also includes an annular-shaped recess 368 along its inner face defining an outer wall 370 similar to the drive clutch 358. Furthermore, the wide end 356 of the wedge 336A opposite the locating cone 366 similarly includes a notch 364 for receiving a stop pin 322.

Each pair of wedges 336A, 336B and spreader bars 334 associated with a subassembly 330, 332 are preferably assembled such that the wedges 336A, 336B are sandwiched between the two spreader bars 334. That is, the opposing slopes 346A, 346B of each spreader bar 334 slidably engage the corresponding inclined surfaces 352A, 352B, respectively, of the associated wedges 336A, 336B. Accordingly, by drawing the two wedges 336A, 336B together, the opposing slopes 346A, 34B of the corresponding spreader bars 334 slide relative to the moving inclined surfaces 352A, 352B of the corresponding wedges 336A, 336B. Since the narrow ends 354 of the wedges 336A, 336B face each other, this axial movement of the wedges 336A, 336B results in radial movement of the spreader bars 334. In other words, by operating the differential screw 350 such that the two wedges 336A, 336B are drawn together, the two associated spreader bars 342 are forced radially outward (i.e., away from each other).

Similarly, by operating the differential screw 350 so as to space the two wedges 336A, 336B further apart, the interrelationship between the opposing slopes 346A, 346B of the spreader bars 334 and the inclined surfaces 352A, 352B of the wedges 336A, 336B results in the two associated spreader bars 334 being drawn radially inward (i.e., closer toward each other). That is, as the wedges 336A, 336B move away from each other, the opposing slopes 346A, 346B of the corresponding spreader bars 334 cause the spreader bars 334 to slide down the inclined surfaces 352A, 352B of the corresponding wedges 336A, 336B.

In sum, the interrelationship of the opposing slopes 346A, 346B on the spreader bars 334 and the inclined surfaces 352A, 352B of the wedges 336A, 336B is such that axial movement of the wedges 336A, 336B induces radial movement of the associated spreader bars 334. A spring 372 may be disposed between each pair of spreader bars 334 associated with a subassembly 330, 332. The spring 372 is preferably biased so as to draw the two bars 334 together whenever the corresponding wedges 336A, 336B are driven further apart axially. The spring 372 also holds the corresponding subassemblies 330, 332 together when removed from the tube 324.

In operation, the two subassemblies 330, 332 are preferably disposed within the tube 324 (FIG. 3A) at opposite ends 316, 318 such that the apex 342 of each spreader bar 334 is aligned with a longitudinal slot 326 in the tube 324. Thus, each base edge 314 of the shells 310, 312 engages a corresponding contact surface 340A, 340B of a spreader bar 334. The wedges 336A, 336B are preferably aligned to move along the axis 325 of the tube 324. Furthermore, the outwardly extending bosses 320 at the ends 316, 318 of the shells 310, 312 are preferably disposed inside the annular recesses 368 in the toothed drive clutch 358 and the locating cone 366.

Figure 4A:
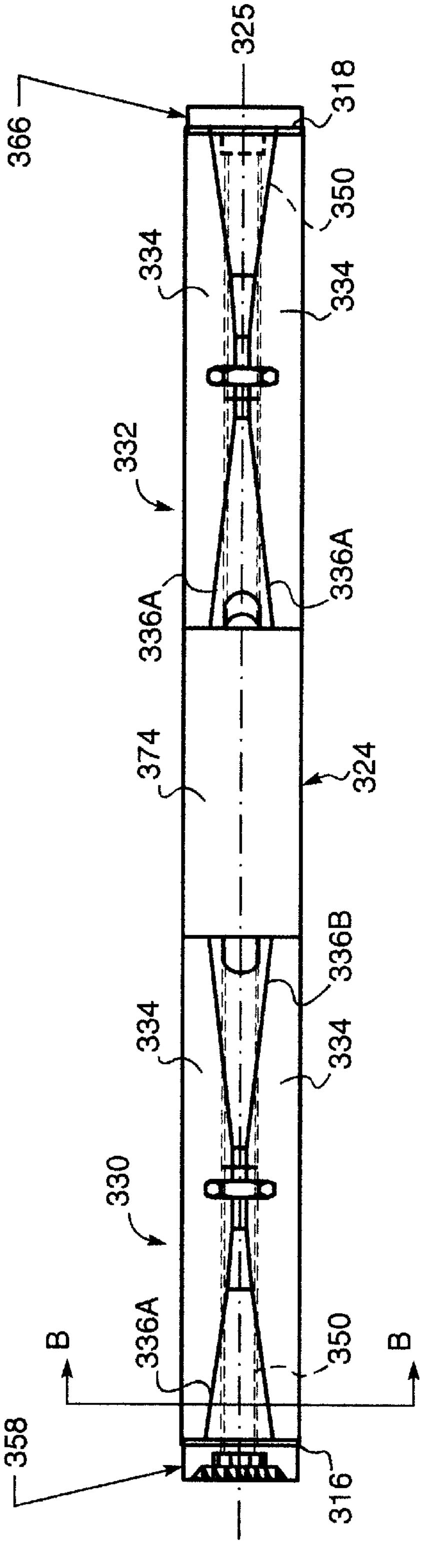
FIG. 4A is a front view of the re-usable mandrel with the semi-cylindrical shells expanded.
Figure 4B:
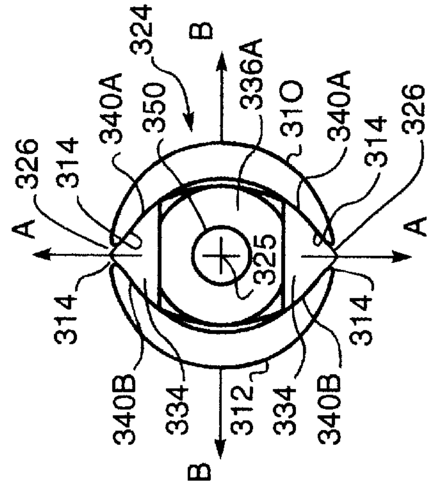
FIG. 4B is an end view of FIG. 4A along lines B—B.

Referring to FIGS. 4A and 4B, the differential screws 350 are then rotated in order to draw the associated wedges 336A, 336B closer together, thereby extending the corresponding spreader bars 334 radially outwardly (i.e., away from each other). The head of each differential screw 350, which may be accessed via the aperture 360 in the drive clutch 358 or the aperture in the locating cone 366 may be slotted or may include a hex head so that the screw may be operated by a screw driver or a wrench (not shown). By moving the spreader bars 334 away from each other, the shells 310, 312 are forced further apart due to their contact at the base edges 314 with the controlling surfaces 340A, 340B of the spreader bars 334. That is, the upper surfaces 338 of the spreader bars 334 are pushed further in-between the semi-cylindrical shells 310, 312 as shown by arrows A (FIG. 4B). Since the upper surface 338 of each spreader bar 334 is triangular-shaped, this forces the two shells 310, 312 further away from each other as shown by arrows B (FIG. 4B).

The tube 324 continues to expand under the driving force of the spreader bars 334 until the outwardly extending bosses 320 (FIG. 3A) located at the ends 316, 318 of the shells 310, 312 contact the outer wall 370 (FIG. 3B) of the annular recesses 368 in the drive clutch 358 and the locating cone 366. In other words, each inner face 370 of these recesses 368 acts as a stop to further expansion of the shells 310, 312. The bosses 320 and the inner walls 370 are preferably arranged so that the diameter of the tube 324, upon contacting these stops 370, is 25.40 millimeters.

The mandrel 300 is now ready to be installed in a plate cylinder (not shown) and to receive the leading edge of plate material (not shown). Specifically, a centrally disposed tongue (not shown) extending from the leading edge of the plate material may be inserted in one of the longitudinal slots 326 (FIG. 3) in the tube 324. Recall that the two subassemblies 330, 332 are positioned at either end 316, 318 of the tube 324 as best shown in FIG. 4A. Thus, a central space 374 is provided between the two subassemblies 330, 332 for receiving the leading edge tongue of the plate material through one of the slots 326 (FIG. 4B). The mandrel 300 is then rotated via a drive means (not shown) operably connected to the drive clutch 358 in order to wrap the plate material around the mandrel 300.

As described in connection with the prior art mandrel, used plate material is taken up by the re-usable mandrel whenever fresh plate material is advanced around the plate cylinder from the supply mandrel. The plate material is also tightened about the plate cylinder by locking the supply mandrel and further rotating the re-usable take-up mandrel until the desired tension is obtained. This process is repeated until all of the plate material on the supply mandrel has been transferred to the take-up mandrel.

Figure 5A:
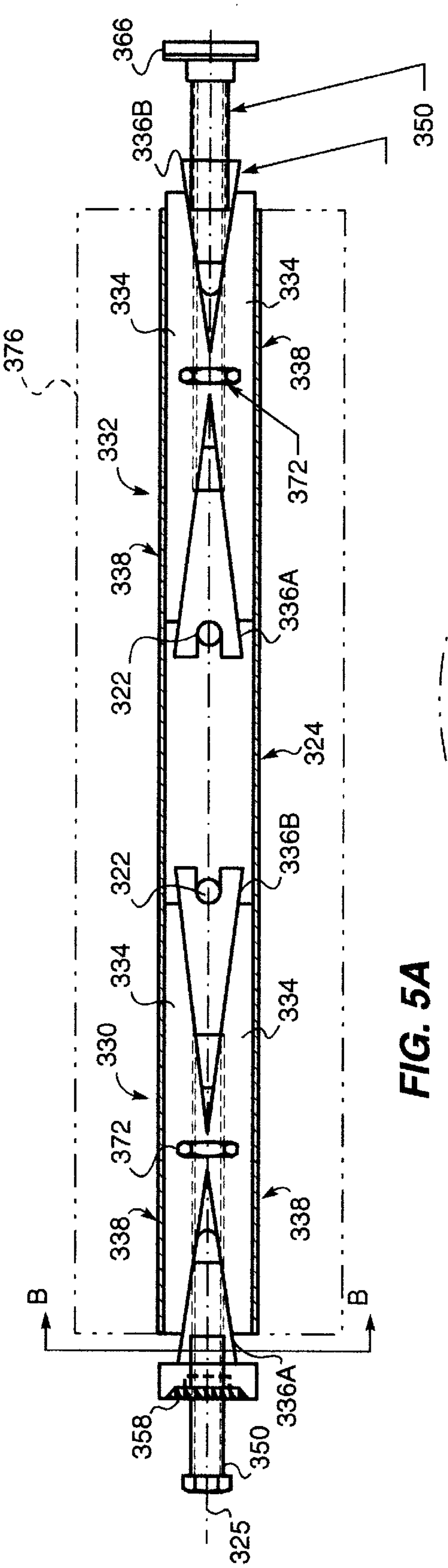
FIG. 5A is a front view of the re-usable mandrel with the semi-cylindrical shells collapsed.
Figure 5B:
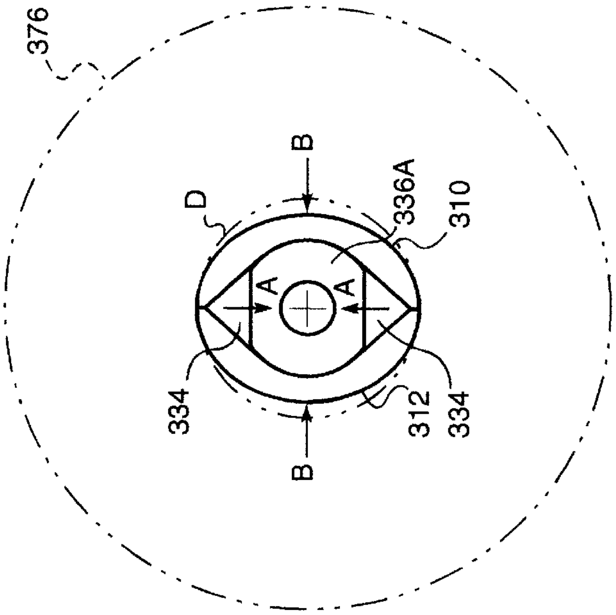
FIG. 5B is an end view of FIG. 5A along lines B—B.

FIGS. 5A and 5B show the take-up mandrel 300 removed from the plate cylinder but still having a spool of used plate material 376 wrapped around it. To remove the mandrel 300 from the spool 376, the differential screws 350 are once again rotated, although this time in an opposite direction. This causes the associated wedges 336A, 336B to move further apart along the axis 325. Accordingly, the corresponding spreader bars 334, which slide relative to the moving inclined surfaces 352A, 352B of the wedges 336A, 336B, are drawn radially inward as shown by arrows A (FIG. 5B). The springs 372 further assist in drawing the associated spreader bars 334 toward each other. By drawing the associated pairs of spreader bars 334 closer together, the shells 310, 312 are similarly drawn together, decreasing the diameter of the tube 324 as shown by arrows B (FIG. 5B). That is, the upper surfaces 338 of the spreader bars 334 are drawn further within the tube 324 allowing the gap between the two shells 310, 312 to narrow since the upper surface 338 of the spreader bars 334 is generally triangular-shaped.

The tube 324 continues to collapse until the inner wedges 336A, 336B contact the stop pins 322 located on the shell 312. That is, each pair of wedges 336A, 336B continues to move away from each other along the axis 325 until the stop pins 322 are received in the notches 364 located in the wide ends 356 of the associated wedges 336A, 336B. At this point, the diameter of the tube 324 is preferably reduced from its original 25.00 millimeters, which is shown in phantom in FIG. 5B and labeled D, to 24.77 millimeters or less.

The re-usable mandrel 300 may now be removed from the spool of used plate material 376. Specifically, the subassembly 332 having the locating cone 366 may be drawn out of its end of the spool of plate material 376. The subassembly 330 having the drive clutch 358 may then be removed from its end of the spool of plate material 376. Finally, the two semi-cylindrical shells 310, 312 may be removed from either end of the spool 376. The shells 310, 312 and the subassemblies 330, 332 may then be re-assembled into the take-up mandrel 300 as described above and reinstalled in the printing cylinder. The take-up mandrel 300 is then ready for use.

The stop pins 322 also disengage any spreader bar 334 that might become stuck to an associated wedge 336A, 336B. That is, a spreader bar 334, rather than slide freely relative to the moving inclined surfaces 352A, 352B of the wedges 336A, 336B, may instead become stuck to one of the surfaces 352A, 352B. This may occur as a result of the surface friction between the wedges 336A, 336B and the spreader bars 334. Contact between the wedges 336A, 336B and the associated stop pins 322 is sufficient to break this surface friction and free any spreader bar 334 that might have become stuck.

As described in the illustrated embodiment above, the controller 328 via the spreader bars 334 preferably engages the two semi-cylindrical shells 310, 312 along their base edges 314. This choice was made in order to improve the structural integrity of the tube 324. It should be understood, however, that the controller may operably engage the semi-cylindrical shells at some point along their inner surfaces or along their entire inner surfaces. That is, the controller may push directly against the inner surface of each shell in order to increase the diameter of the tube. In addition, the wedges, rather than having relatively flat inclined surfaces for engaging the spreader bars, may be conically shaped. In this embodiment, the inner surfaces of the spreader bars would be concavely shaped in order to slide relative to the conical surfaces of the wedges.

It also should be understood that each subassembly may include only one spreader bar or that the controller may comprise only one subassembly. For example, the leading edge of the plate material may be modified to include two tongues at its outer edges, rather than a single, centrally disposed tongue. In this case, a single subassembly could be centrally disposed inside the mandrel, thereby allowing the two outer tongues to be received into the mandrel.

It also should be understood that the controller 328 may be automatically activated during the appropriate stages in the printing process to set the mandrel 300 at the desired diameter(s).

It should be understood that the spool of used plate material may be removed from the re-usable mandrel without removing the mandrel from the interior of the plate cylinder. For example, with the re-usable mandrel still mounted within the plate cylinder, the controller may be accessed through an end of the plate cylinder and adjusted in order to decrease the diameter of the reusable mandrel. The spool of plate material may then be drawn off of the collapsed mandrel and removed through the end of the plate cylinder. Thereafter, the re-usable mandrel may be returned to its starting diameter and a fresh sheet of plate material attached thereto.

Figure 6:
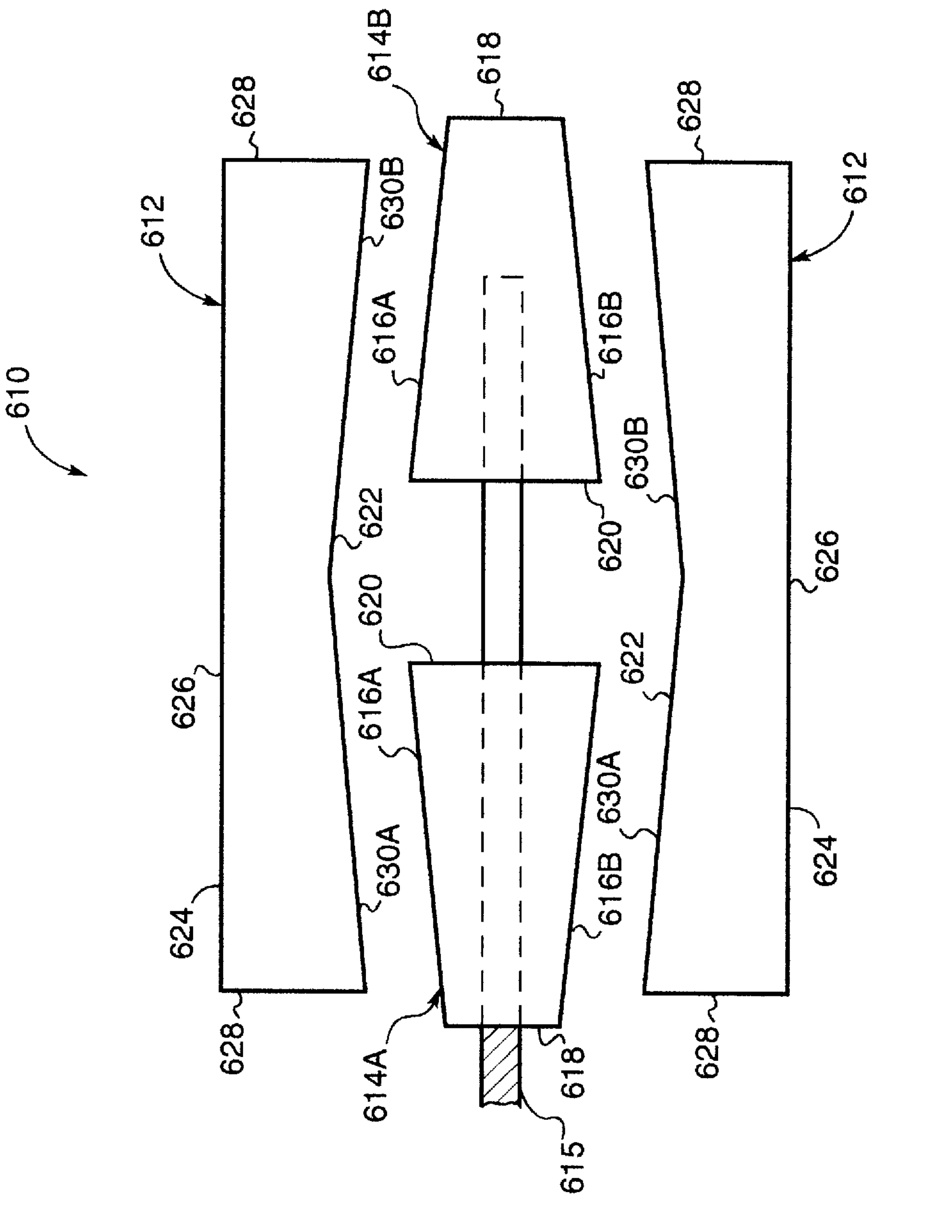
FIG. 6 is a front view of another embodiment of a subassembly of the reusable mandrel.

FIG. 6 illustrates another embodiment of a subassembly 610. The subassembly 610 similarly comprises two spreader bars 612 sandwiched between two wedges 614A, 614B. The wedges 614A, 614B are operably connected by a differential screw 615. Each wedge 614A, 614B, moreover, has two opposing inclined surfaces 616A, 616B, thereby defining a narrow end 618 and a wide end 620 of each wedge 614A, 614B. In this embodiment, however, the wedges 614A, 614B are preferably arranged such that their wide ends 620 are facing each other.

Each spreader bar 612 similarly includes an inner surface 622 and a triangular-shaped outer surface 624 and has a center point 626 and two ends 628. The outer surface 624 of each spreader bar 614 engages two semi-cylindrical shells (not shown) that are spaced apart to form a tube (not shown). Furthermore, the inner surface 622 of each spreader bar 612 has two opposing slopes 630A, 630B. In order for the inner surface 622 of the spreader bar 612 to slidably engage the adjacent wedges 614A, 614B, the opposing slopes 630A, 630B are preferably arranged so that the spreader bar 612 is wider at its ends 628 than at its center points 626.

In this embodiment, by operating the differential screw 612 so that the two wedges 614A, 614B are drawn closer together, the corresponding spreader bars 612 are also drawn closer together. In addition, by operating the differential screw 615 so that the two wedges 614A, 614B are pushed further apart, the corresponding spreader bars 612 are similarly pushed further apart. Accordingly, the diameter of the tube formed by the two semi-cylindrical shells may be selectively adjusted.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A reusable mandrel comprising:

two semi-cylindrical shells;

a tube formed by spacing the two semi-cylindrical shells slightly apart, the tube having two opposing longitudinal slots and a diameter; and a controller disposed inside the tube, the controller comprising two subassemblies, each subassembly comprising:

two spreader bars disposed within and extending longitudinally relative to the tube, each spreader bar having an inner surface and an outer surface, the outer surface of each spreader bar engaging a portion of the tube; and a pair of opposing wedges sandwiched between the two spreader bars, wherein the controller operably engages the two semi-cylindrical shells of the tube by driving the two spreader bars of each subasssembly one of radially outward and radially inward through sliding engagement between the inner surfaces of the spreader bars and the pair of opposing wedges such that activation of the controller selectively adjusts the diameter of the tube.

2. The reusable mandrel of claim 1 wherein the pair of wedges associated with each subassembly are operably connected by a differential screw such that operation of the differential screw causes the pair of wedges to move either closer together or further apart, thereby adjusting the diameter of the tube.

3. The reusable mandrel of claim 2 wherein each wedge includes two opposing sloped surfaces defining a narrow end and a wide end of each wedge and the pair of wedges associated with each subassembly are disposed such that the narrow ends of the wedges face each other.

4. The reusable mandrel of claim 3 wherein each spreader bar includes a triangular-shaped outer surface having an apice and two angled contact surfaces for engaging the respective portion of the tube.

5. The reusable mandrel of claim 4 wherein the inner surface of each spreader bar includes two oppositely inclined surfaces that slidably engage the opposing sloped surfaces of the corresponding pair of opposing wedges.

6. The reusable mandrel of claim 5 wherein each subassembly of the controller is disposed inside the tube such that the apice of each spreader bar associated with a given subassembly is aligned along a different one of the two opposing slots of the tube.

7. The reusable mandrel of claim 6 wherein each semi-cylindrical shell has two longitudinal edges and further wherein, by spacing two semi-cylindrical shells slightly apart, two opposing pairs of edges are formed that define the two longitudinal slots.

8. The reusable mandrel of claim 7 wherein each subassembly of the controller is disposed inside the tube such that the angled contact surfaces of each spreader bar engage one opposing pair of edges of the semi-cylindrical shells.

9. The reusable mandrel of claim 8 wherein by operating the differential screw associated with a pair of wedges so that the two wedges are drawn closer together, the corresponding spreader bars slide in relation to the moving sloped surfaces of the adjacent wedges such that the two spreader bars move further away from each other.

10. The reusable mandrel of claim 9 wherein the edges of the two shells slide along the moving contacting surfaces of the associated spreader bars such that the two shells are forced further apart increasing the diameter of the tube.

11. The reusable mandrel of claim 8 wherein by operating the differential screw associated with a pair of wedges so that the two wedges are forced further apart, the corresponding spreader bars slide in relation to the moving sloped surfaces of the adjacent wedges such that the two spreader bars move closer together.

12. The reusable mandrel of claim 11 wherein the edges of the two shells slide along the moving contacting surfaces of the associated spreader bars such that the two shells collapse closer together decreasing the diameter of the tube.

13. The reusable mandrel of claim 2 wherein each wedge includes two opposing sloped surfaces defining a narrow end and a wide end of each wedge and the pair of wedges associated with each subassembly are disposed such that the wide ends of the wedges face each other.

14. The reusable mandrel of claim 13 wherein the inner surface of each spreader bar includes two oppositely inclined surfaces that slidably engage the opposing sloped surfaces of the corresponding pair of opposing wedges.

15. The reusable mandrel of claim 14 wherein by operating the differential screw associated with a pair of wedges so that the two wedges are drawn closer together, the corresponding spreader bars slide in relation to the moving sloped surfaces of the adjacent wedges such that the two spreader bars move closer together.

16. The reusable mandrel of claim 14 wherein by operating the differential screw associated with a pair of wedges so that the two wedges are forced further apart, the corresponding spreader bars slide in relation to the moving sloped surfaces of the adjacent wedges such that the two spreader bars move further apart.

17. A re-usable mandrel operatively coupleable to a rotational drive having a quantity of plate material rolled therearound, an outer surface and a diameter, the re-usable mandrel comprising:

at least one slot formed in the outer surface of the mandrel for accepting and securing the plate material to the mandrel;

means for operably engaging a rotational drive, such that activation of the rotational drive causes the mandrel to accept additional plate material; and means for allowing removal of the quantity of plate material from the mandrel in an axial direction, including means to vary the diameter of the mandrel.

18. The reusable mandrel of claim 17 further comprising two ends wherein the means for varying the diameter is accessible from at least one end of the mandrel.

19. The reusable mandrel of claim 18 further comprising two semi-cylindrical shells spaced slightly apart so as to form a tube having two opposing longitudinal slots, wherein the means for varying the diameter of the mandrel is a controller disposed inside the tube and the controller operably engages the two semi-cylindrical shells of the tube so as to adjust the diameter of the mandrel.

20. The reusable mandrel of claim 19 wherein the controller comprises two subassemblies and each subassembly includes a pair of opposing wedges sandwiched between two spreader bars.

21. The reusable mandrel of claim 20 wherein the pair of wedges associated with each subassembly are operably connected by a differential screw such that operation of the differential screw causes the pair of wedges to move either closer together or further apart, thereby adjusting the diameter of the tube.

22. A plate cylinder having an interior and an exterior surface, the plate cylinder comprising:

means for accepting a pair of mandrels in the interior, each mandrel having a diameter; and means for facilitating passage of a plate material from one mandrel around at least a portion of the exterior surface of the plate cylinder to the other mandrel;

wherein at least one mandrel is capable of being operably coupled to a rotational drive and comprises:

an outer surface having a quantity of plate material rolled therearound;

means for accepting and securing the plate material to the at least one mandrel;

means for operably engaging the rotational drive, such that activation of the rotational drive causes the at least one mandrel to accept additional plate material; and means for allowing removal of the quantity of plate material from the at least one mandrel in an axial direction, including means to vary the diameter of the at least one mandrel.

* * * * *